United States Patent [19]

Berke

[11] 4,263,621
[45] Apr. 21, 1981

[54] CHARGE COUPLED DEVICE SIGNAL OUTPUT SUMMING CIRCUIT

[75] Inventor: Herbert Berke, Maitland, Fla.

[73] Assignee: The United States of America as represented by the Secretary of the Navy, Washington, D.C.

[21] Appl. No.: 50,946

[22] Filed: Jun. 21, 1979

[51] Int. Cl.³ .............................................. H04N 3/14
[52] U.S. Cl. ................................................. 358/213
[58] Field of Search ........................ 358/213, 160, 87

[56] References Cited
U.S. PATENT DOCUMENTS 4,119,916  10/1978  Berke ..................................... 328/62

Primary Examiner—Richard Murray

Attorney, Agent, or Firm—Richard S. Sciascia; Robert W. Adams; David S. Kalmbaugh

[57] ABSTRACT

A charge coupled device signal output summing circuit is disclosed for providing a video data signal to a scan laser projector system which projects an optical image on a 360° wide angle display screen. The charge coupled device signal output summing circuit comprises a linear image sensor which senses the light received from the optical image and produces a pair of output signals, each of which has a plurality of video data components. The video data components of the pair of output signals are then summed by a unique combination of buffers, analog switches, capacitors, a video amplifier, and adder to produce the video data signal.

26 Claims, 3 Drawing Figures

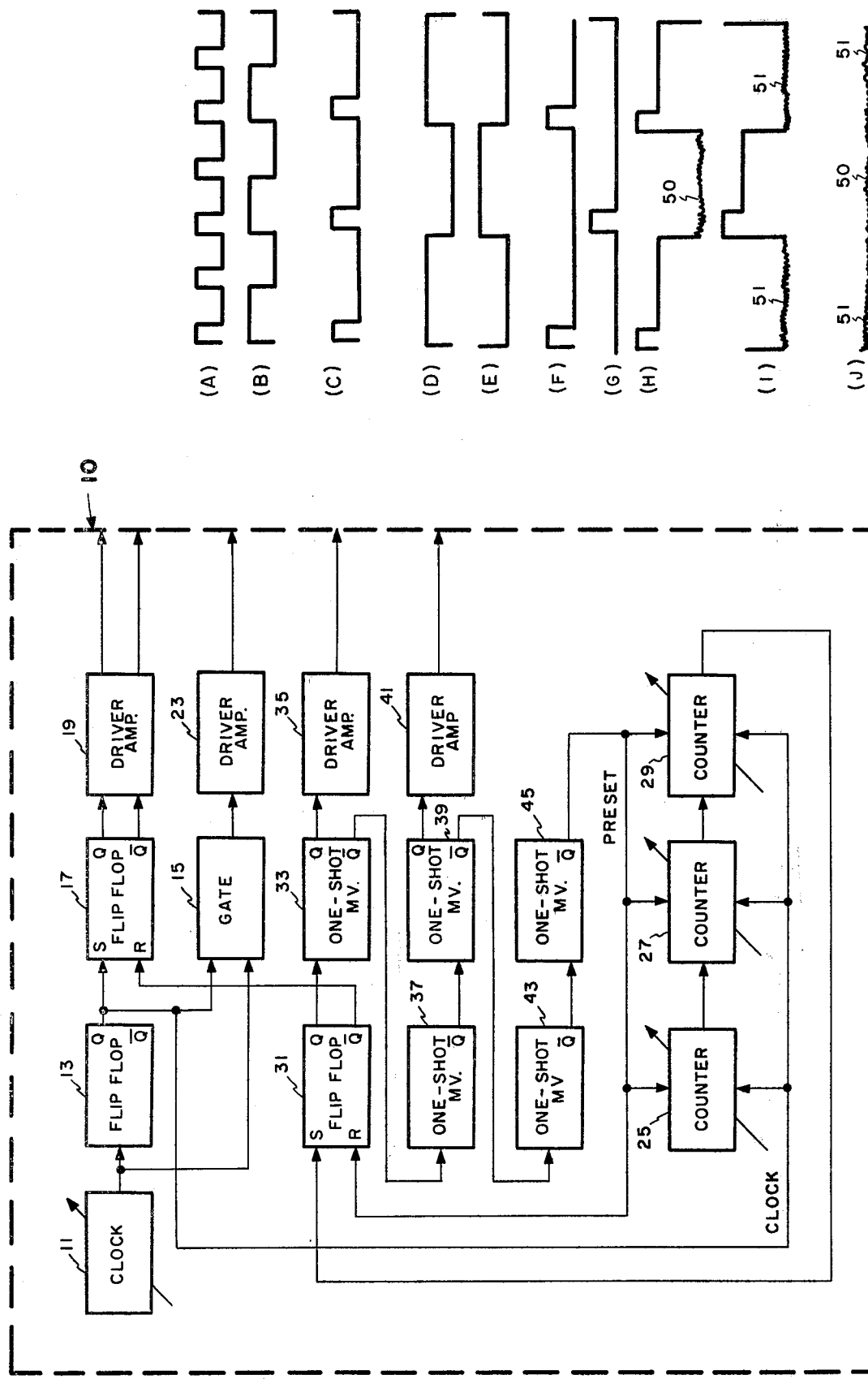

CHARGE COUPLED DEVICE SIGNAL OUTPUT SUMMING CIRCUIT

BACKGROUND OF THE INVENTION

1. Field of the Invention

The present invention, in general, relates to data processors. In particular, the present invention relates to a summing circuit which provides a video data signal in response to the sensing of an optical image by a linear image sensor.

2. Description of the Prior Art

A variety of video data summing circuits are available for summing the output signals from a charge coupled device to provide a video data signal for a laser scan projector system which displays an optical image on a 360° wide angle display screen. Such prior art devices employ conventional summing amplifiers to combine the output signals from the charge coupled device.

However, these prior art devices, when combining the output signals from the charge coupled device, pass noise in the form of clock signals which drive the charge coupled device. The noise passed by the prior art devices, in turn, distorts the optical image which is displayed on the 360° wide angle display screen. Therefore, a video data summing circuit, such as the subject invention, is needed to filter out the noise from the video data signal, and thus eliminates distortion from the optical image being displayed on the 360° wide angle display screen.

SUMMARY OF THE INVENTION

The subject invention overcomes some of the disadvantages of the prior art, including those mentioned above, in that it comprises a relatively simple summing circuit which provides a video data signal to a scan laser projector system. The scan laser projector system then projects an optical image on a 360° wide angle display screen.

A linear image sensor scans the optical image to be displayed on the 360° wide angle display screen, and produces a pair of output signals which are in response to the light received from the optical image. The pair of output signals, each of which has a plurality of video data components, are supplied to a sample and hold circuit. The sample and hold circuit samples the plurality of video data components of the pair of output signals, and then stores the sampled video data components. A video amplifier, in turn, filters out the direct current voltage components from the stored video data components and then sequentially passes the stored video data components to an adder. The adder then sums the passed video data components to provide the video data signal to be displayed upon the 360° wide angle display screen.

BRIEF DESCRIPTION OF THE DRAWINGS

FIG. 2 is an electrical schematic of the circuit constituting the master timer of FIG. 1; and FIG. 3 is a graphical representation of various pulses which occur at the outputs of some of the elements of FIG. 1.

DESCRIPTION OF THE PREFERRED EMBODIMENT

Figure 1:
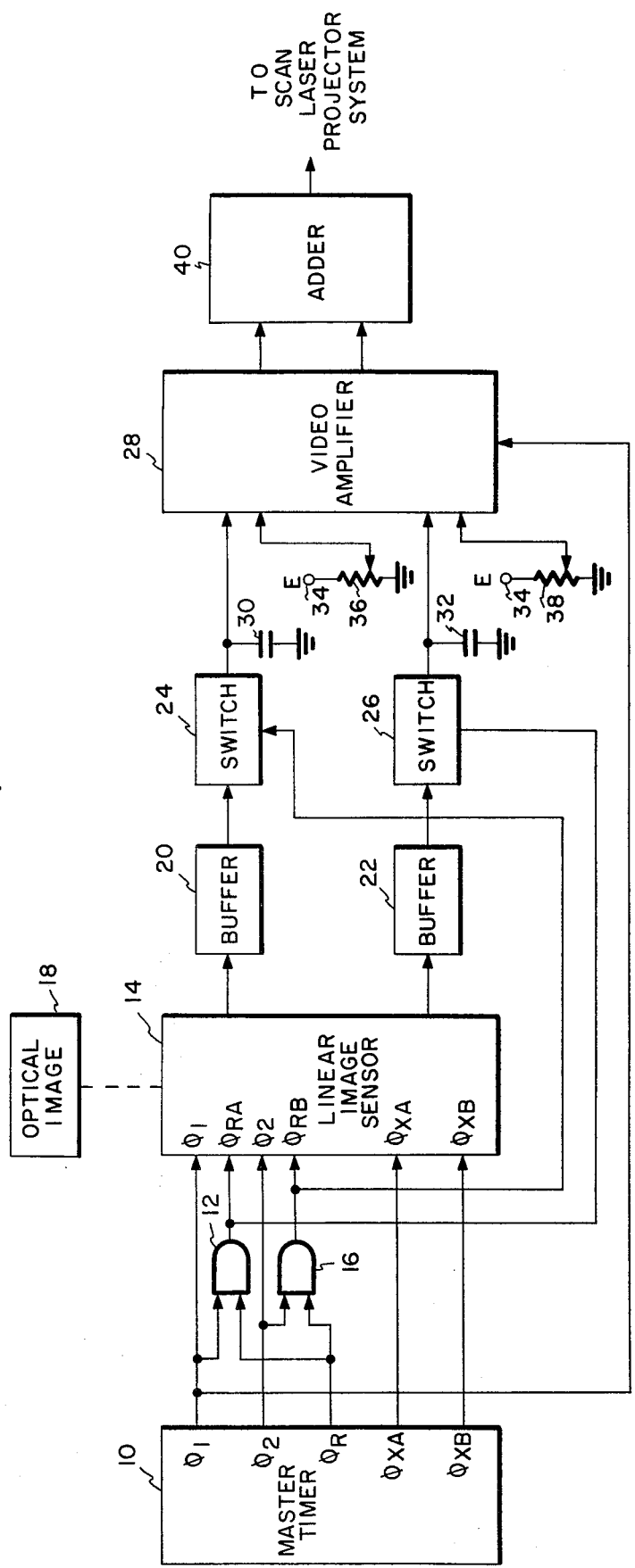
FIG. 1 is an electrical schematic of the circuit constituting the subject invention.

The preferred embodiment of the subject invention will now be discussed in some detail in conjunction with all of the figures of the drawings, wherein like parts are designated by like reference numerals, insofar as it is possible to do so.

Referring now to the embodiment of the invention illustrated in FIG. 1, there is shown a master timer 10, the operation of which is described in U.S. Pat. No. 4,119,916, entitled Programmable Charge Coupled Device Timing System, and which will be discussed more fully below.

The $\phi_1$ output of master timer 10 is connected to the first input of an AND gate 12, the $\phi_1$ input of a linear image sensor 14, and the first input of a video amplifier 28. The $\phi_2$ output of master timer 10 is connected to the first input of an AND gate 16, and the $\phi_2$ input of linear image sensor 14. The $\phi_R$ output of master timer 10 is connected to the second input of AND gate 12, with the output thereof connected to the $\phi_{RA}$ input of linear image sensor 14, and the first input of a switch 26. The $\phi_R$ output of master timer 10 is also connected to the second input of AND gate 16, the output of which is connected to the $\phi_{RB}$ input of linear image sensor 14 and the first input of switch 24. The $\phi_{XA}$ output and the $\phi_{XB}$ output of master timer 10 are respectively connected to the $\phi_{XA}$ input and the $\phi_{XB}$ input of linear image sensor 14. An optical image 18 is spatially disposed directly downstream from the optical input of linear image sensor 14.

Linear image sensor 14 may be any charge coupled device that is suitable for being enabled by the timing signals generated by master timer 10. Nevertheless, for the particular preferred embodiment of the subject invention, it has been found that the charge coupled device named 1024-Element Linear Image Sensor, Model CCD 131, manufactured by Fairchild, Inc., of Mountain View, Calif., performs quite satisfactorily as linear image sensor 14. Also to be noted at this time is the fact that optical image 18 is a wide angle photographic negative.

The first output of linear image sensor 14 is connected to the input of buffer 20, the output of which is connected to the second input of switch 24, with the output thereof connected to the second input of video amplifier 28, and a capacitor 30. Similarly, the second output of linear image sensor 14 is connected to the input of a buffer 22, the output of which is connected to the first input of switch 26, with the output thereof connected to the third input of video amplifier 28, and a capacitor 32.

A voltage source 34 is effectively connected to the fixed resistance element of a potentiometer 36, the movable arm of which is connected to the fourth input of video amplifier 28. Further, voltage source 34 is effectively connected to the fixed resistance element of a potentiometer 38, with the movable arm thereof connected to the fifth input of video amplifier 28.

Buffers 20 and 22 are NPN transistors. Switches 24 and 26 may be any conventional and commerically available analog switch. In particular, it has been found that an analog switch, Model SH3003, manufactured by Fairchild, Inc., of Mountain View, Calif., performs quite satisfactorily as switches 24 and 26.

Video amplifier 28 is a gate controlled two-channel input wideband amplifier, Model MC1545, manufactured by Motorola, Inc., of Phoenix, Ariz.

The first output and the second output of video amplifier 28 are respectively connected to the first input and the second input of an adder 40, which may be any conventional and commerically available summing amplifier.

Referring now to FIG. 2, there is shown an electrical circuit diagram of master timer 10 which has been modified from the electrical circuit diagram of the Programmable Charge Coupled Device Timing System disclosed in U.S. Pat. No. 4,119,916. In particular, the Q output of a flipflop 13 is connected to the control input of a control gate 15. As disclosed in FIG. 1 of U.S. Pat. No. 4,119,196, the $\bar{Q}$ output of flip-flop 13 is connected to the control input of control gate 15. As will be discussed in detail below, the operation of master timer 10 is slightly different from the Programmable Charge Coupled Device Timing System disclosed in U.S. Pat. No. 4,119,196.

The operation of the present invention will now be discussed in detail in conjunction with FIGS. 1, 2, and 3, with the latter figure portraying representative digital and analog signals with idealized waveforms.

Referring to FIG. 1, master timer 10 is the basic control element of the subject invention. Accordingly, master timer 10 generates a plurality of clock signals including a $\phi_R$ clock signal, a $\phi_1$ clock signal, a $\phi_2$ clock signal, respectively represented by the signals of FIG. 3(C) thru FIG. 3(E), a $\phi_{XA}$ clock signal, not shown, and a $\phi_{XB}$ clock signal, not shown. The aforementioned clock signals will now be defined as follows so as to facilitate the better understanding of the subsequently discussed structural elements pertinent thereto:

$\phi_1$ and $\phi_2$ = analog shift register transport clock signals which are respectively applied to the gates of the shift registers of a charge coupled device (CCD), so as to move the charge packets received from the image sensor elements of the CCD to the gated charge-detector preamplifiers of the CCD;

$\phi_R$ = reset clock signal which contains a voltage waveform required to drive the gated charge detector preamplifiers of the CCD; and $\phi_{XA}$ and $\phi_{XB}$ = transfer gate clock signals, the voltage waveforms of which are applied to the transfer gates of the CCD so as to move the accumulated charge from the image sensor elements of the CCD to the shift registers of the CCD.

As mentioned above, for an analysis of the generation of the $\phi_1$ clock signal, the $\phi_2$ clock signal, the $\phi_{XA}$ clock signal, and the $\phi_{XB}$ clock signal by master timer 10, reference is hereby made to U.S. Pat. No. 4,119,916. Further, as discussed previously, the electrical circuit diagram of master timer 10 has been modified from the electrical circuit diagram of the Programmable Charge Coupled Device Timing System disclosed in U.S. Pat. No. 4,119,916. This modification of the electrical circuit diagram of master timer 10 results in the $\phi_R$ clock signal being generated by master timer 10 as illustrated by FIG. 3(C).

Referring now to FIG. 2, a clock 11 generates a clock pulse signal having a frequency similar to that depicted in FIG. 3(A). The clock pulse signal is supplied to the trigger input of flipflop 13 which, in turn, produces a signal similar to that shown in FIG. 3(B) at the Q output thereof. The Q signal of FIG. 3(B) and the clock pulse signal of FIG. 3(A) are respectively supplied to the first and second inputs of gate 15 which produces a signal having the frequency of the waveform shown in FIG. 3(C). The signal produced by gate 15 is then amplified to a more useful voltage level by a driver amplifier 23, resulting in the $\phi_R$ signal shown in FIG. 3(C).

Referring to FIG. 1, the $\phi_1$ signal of FIG. 3(D) and the $\phi_R$ signal of FIG. 3(C) are respectively supplied to the first and second inputs of AND gate 12 which produces a $\phi_{RA}$ clock signal similar to that illustrated in the signal of FIG. 3(F). Similarly, the $\phi_1$ signal of FIG. 3(D) and the $\phi_R$ signal of FIG. 3(C) are respectively supplied to the first and second inputs of AND gate 16 which produces a $\phi_{RB}$ clock signal similar to that illustrated in the signal of FIG. 3(G). The $\phi_1$ clock signal, the $\phi_2$ clock signal, the $\phi_{RA}$ clock signal, the $\phi_{RB}$ clock signal of FIG. 3(D) thru FIG. 3(G), the $\phi_{XA}$ clock signal, not shown, and the $\phi_{XB}$ clock signal, not shown, are then supplied to the $\phi_1$ input, the $\phi_2$ input, the $\phi_{RA}$ input, the $\phi_{RB}$ input, the $\phi_{XA}$ input, and the $\phi_{XB}$ input of linear image sensor 14, respectively.

Linear image sensor 14 scans optical image 18, which as discussed previously, is a wide angle photographic negative. The light received from optical image 18 is absorbed at the optical input of linear image sensor 14 by a row of 1024 image sensor elements included within linear image sensor 14. The 1024 image sensor elements, which are charge coupled devices, convert the light received from optical image 18 to a pair of accumulated charge signals. The first of the pair of accumulated charge signals is transferred to a first analog shift register, included within linear image sensor 14, by the $\phi_{XA}$ clock signal, not shown, generated by master timer 10. Similarly, the second of the pair of accumulated charge signals is transferred to a second analog shift register, included within linear image sensor 14, by the $\phi_{XB}$ clock signal, not shown, generated by master timer 10. The first of the pair of accumulated charge signals is then transferred from the first analog shift register of linear image sensor 14 to a first gated charge-detector preamplifier, included within linear image sensors 14, by the $\phi_1$ clock signal of FIG. 3(D). Similarly, the second of the pair of accumulated charge signals is transferred from the second analog shift register of linear image sensor 14 to a second gated charge-detector preamplifier, included within linear image sensor 14, by the $\phi_2$ clock signal of FIG. 3(E). The $\phi_{RA}$ clock signal of FIG. 3(F) drives the first gated charge-detector preamplifier of linear image sensor 14, resulting in a first output signal, similar to that illustrated in the signal of FIG. 3(H), being produced at the first output of linear image sensor 14. Similarly, the $\phi_{RB}$ clock signal of FIG. 3(G) drives the second gated charge-detector preamplifier of linear image sensor 14, resulting in a second output signal, similar to that illustrated in the signal of FIG. 3(I), being produced at the second output of linear image sensor 14. The first output signal of FIG. 3(H) which has a plurality of video data components 50 and the second output signal of FIG. 3(I) which has a plurality of video data components 51, when combined by the subject invention, form a video data signal similar to the signal of FIG. 3(J).

The first output signal of FIG. 3(H) and the second output signal of FIG. 3(I) are supplied to the input of buffer 20 and the input of buffer 22, respectively, which amplify the first and second output signals.

The first output signal of FIG. 3(H) is then supplied to the second input of switch 24 which is triggered by the $\phi_{RB}$ clock signal of FIG. 3(G). When the $\phi_{RB}$ clock signal changes from a low state to a high state, switch 24 closes so as to cause capacitor 30 to store one of the plurality of video data components 50 of the first output signal of FIG. 3(H).

Similarly, the second output signal of FIG. 3(I) is supplied to the second input of switch 26, which is triggered by the $\phi_{RA}$ clock signal of FIG. 3(F). When the $\phi_{RA}$ clock signal changes from a low state to a high state, switch 26 closes so as to cause capacitor 32 to store one of the plurality of video data components 51 of the second output signal of FIG. 3(I).

Stored video data component 50 is supplied to the second input of video amplifier 28, and stored video data component 51 is supplied to the third input of video amplifier 28. Video amplifier 28 includes a pair of gated differential amplifiers which are triggered by the $\phi_1$ clock signal of FIG. 3(D). When the $\phi_1$ clock signal of FIG. 3(D) is in a high state, the first of the pair of differential amplifiers of video amplifier 28 passes video data component 50 from capacitor 30 to the first input of adder 40. In addition, the first of the pair of differential amplifiers of video amplifier 28 filters out the direct current voltage component from video data component 50 by subtracting video data component 50 from a direct current reference voltage provided by potentiometer 36.

When the $\phi_1$ clock signal of FIG. 3(D) is in a low state, the second of the pair of differential amplifiers of video amplifier 28 passes video data component 51 from capacitor 32 to the second input of adder 40. In addition, the second of the pair of differential amplifiers of video amplifier 28 filters out the direct current voltage component from video data component 51 by subtracting video data component 51 from a direct current reference voltage provided by potentiometer 38.

Adder 40 then sums video data component 50 and video data component 51 to produce the video data signal of FIG. 3(J). The video data signal of FIG. 3(J) is then supplied to a scan laser projector system, not shown, which projects optical image 18 on a 360° wide angle display screen, not shown.

From the foregoing description, it may readily be seen that the subject invention comprises a new, unique, and exceedingly useful charge coupled device signal output summing circuit which constitutes a considerable improvement over the prior art. Obviously, many modifications and variations of the present invention are possible in light of the above teachings. It is therefore to be understood that within the scope of the appended claims, the invention may be practiced otherwise than as specifically described.

What is claimed is:

1. A charge coupled device signal output summing circuit comprising in combination:

timing circuit means having first, second, third, fourth, fifth, and sixth outputs for generating first, second, third, fourth, fifth, and sixth clock signals, each of which has a plurality of uniformly spaced pulses; sensing means having first, second, third, fourth, fifth, and sixth inputs effectively and respectively connected to the first, second, third, fourth, fifth, and sixth outputs of said timing circuit means, a first signal output, a second signal output, and an optical input for producing a pair of output signals, each of which has a plurality of video data components, and each of which is in proportion to the amount of light received from an optical image at the optical input thereof;

switching means having a first input connected to the fourth output of said timing circuit means, a second input connected to the third output of said timing circuit means, a third input connected to the first signal output of said sensing means, a fourth input connected to the second signal output of said sensing means, a first output, and a second output for sampling the plurality of video data components of the first of said pair of output signals in response to the uniformly spaced pulses of said fourth clock signal, for storing therein the plurality of sampled video data components of the first of said pair of output signals, for sampling the plurality of video data components of the second of said pair of output signals in response to the uniformly spaced pulses of said third clock signal, and for storing therein the plurality of sampled video data components of the second of said pair of output signals;

video amplifying means having a first input connected to the first output of said timing circuit means, a second input connected to the first output of said switching means, a third input connected to the second output of said switching means, a first output, and a second output for filtering out the direct current voltage component from the plurality of stored video data components of said pair of output signals, and for sequentially passing the plurality of stored video data components of said pair of output signals in response to the uniformly spaced pulses of said first clock signal;

summing means having a first input connected to the first output of said video amplifying means, a second input connected to the second output of said video amplifying means, and an output for adding the plurality of passed video data components of said pair of output signals so as to provide a video data signal.

2. A charge coupled device signal output summing circuit according to claim 1, wherein said timing circuit means comprises:

a master timer having a first output, a second output, a third output, a fourth output, and a fifth output;

a first AND gate having a first input connected to the first output of said master timer, and a second input connected to the third output of said master timer; and a second AND gate having a first input connected to the first output of said master timer, and a second input connected to the third output of said master timer.

3. A charge coupled device signal output summing circuit according to claim 1, wherein said master timer comprises a programmable charge coupled device timing system.

4. A charge coupled device signal output summing circuit according to claim 1, wherein said sensing means comprises:

a linear image sensor having a first input, a second input, a third input, a fourth input, a fifth input, and a sixth input effectively and respectively connected to the first output, the second output, the third output, the fourth output, the fifth output, and the sixth output of said timing circuit means, and having a first and a second output;

a first buffer having an input connected to the first output of said linear image sensor; and a second buffer having an input connected to the second output of said linear image sensor.

5. A charge coupled device signal output summing circuit according to claim 4, wherein said linear image sensor comprises a monolithic self-scanned 1024 element image sensor.

6. A charge coupled device signal output summing circuit according to claim 4, wherein said linear image sensor comprises a charge coupled device.

7. A charge coupled device signal output summing circuit according to claim 4, wherein said first and second buffers are transistors.

8. A charge coupled device signal output summing circuit according to claim 4, wherein said first and second buffers are NPN transistors.

9. A charge coupled device signal output summing circuit according to claim 1, wherein said switching means comprises:
   a first switch having a first input connected to the fourth output of said timing circuit means, a second input connected to the first signal output of said sensing means, and an output;
   a second switch having a first input connected to the third output of said timing circuit means, a second input connected to the second signal output of said sensing means, and an output;
   a first capacitor effectively connected to the output of said first switch; and
   a second capacitor effectively connected to the output of said second switch.

10. A charge coupled device signal output summing circuit according to claim 9, wherein said first and second switches are analog switches.

11. A charge coupled device signal output summing circuit according to claim 1, wherein said video amplifying means comprises:
   a voltage source;
   a first potentiometer having a fixed resistance element and a movable arm in slidable engagement therewith, with the fixed resistance element of said first potentiometer effectively connected to said voltage source;
   a second potentiometer having a fixed resistance element and a movable arm in slidable engagement therewith, with the fixed resistance element of said second potentiometer effectively connected to said voltage source; and
   a gate controlled two-channel input wideband amplifier having a first input connected to the first output of said timing circuit means, a second input connected to the first output of said switching means, a third input connected to the second output of said switching means, a fourth input connected to the movable arm of said first potentiometer, and a fifth input connected to the movable arm of said second potentiometer.

12. A charge coupled device signal output summing circuit according to claim 1, wherein said summing means comprises a summing amplifier.

13. A charge coupled device signal output summing circuit according to claim 1, wherein said optical image comprises a wide angle photographic negative.

14. A summing circuit comprising in combination:
   a master timer having first, second, third, fourth, and fifth outputs;
   a first AND gate having a first input connected to the first output of said master timer, a second input connected to the third output of said master timer, and an output;
   a second AND gate having a first input connected to the second output of said master timer, a second input connected to the third output of said master timer, and an output;
   a linear image sensor having a first input connected to the first output of said master timer, a second input connected to the output of said first AND gate, a third input connected to the second output of said master timer, a fourth input connected to the output of said second AND gate, a fifth input connected to the fourth output of said master timer, a sixth input connected to the fifth output of said master timer, a first output, a second output, and an optical input;
   a first buffer having an input connected to the first output of said linear image sensor and an output;
   a second buffer having an input connected to the second output of said linear image sensor and an output;
   a sample and hold circuit having a first input connected to the output of said second AND gate, a second input connected to the output of said first AND gate, a third input connected to the output of said first buffer, a fourth input connected to the output of said second buffer, a first output, and a second output;
   an amplifier circuit having a first input connected to the first output of said master timer, a second input connected to the first output of said sample and hold circuit, a third input connected to the second output of said sample and hold circuit, a first output, and a second output; and
   an adder having a first input connected to the first output of said video amplifier, a second input connected to the second output of said video amplifier, and an output.

15. A summing circuit according to claim 14, wherein said master timer comprises a programmable charge coupled device timing system.

16. A summing circuit according to claim 14, wherein said linear image sensor comprises a monolithic self-scanned 1024 element image sensor.

17. A summing circuit according to claim 14, wherein said linear image sensor comprises a charge coupled device.

18. A summing circuit according to claim 14, wherein said first and second buffers are transistors.

19. A summing circuit according to claim 14, wherein said first and second buffers are NPN transistors.

20. A summing circuit according to claim 14, wherein said sample and hold circuit comprises:
   a first switch having a first input connected to the output of said second AND gate, a second input connected to the output of said first buffer, and an output;
   a second switch having a first input connected to the output of said first AND gate, a second input connected to the output of said second buffer, and an output;
   a first capacitor effectively connected to the output of said first switch; and
   a second capacitor effectively connected to the output of said second switch.

21. A summing circuit according to claim 20, wherein said first and second switches are analog switches.

22. A summing circuit according to claim 14, wherein said amplifier circuit comprises:
   a voltage source;

a first potentiometer having a fixed resistance and a movable arm in slidable engagement therewith, with the fixed resistance of said first potentiometer effectively connected to said voltage source;

a second potentiometer having a fixed resistance and a movable arm in slidable engagement therewith, with the fixed resistance of said second potentiometer effectively connected to said voltage source;

a video amplifier having a first input connected to the first output of said master timer, a second input connected to the first output of said sample and hold circuit, a third input connected to the second output of said sample and hold circuit, a fourth input connected to the movable arm of said first potentiometer, and a fifth input connected to the movable arm of said second potentiometer.

23. A summing circuit according to claim 22, wherein said video amplifier comprises a gate controlled two-channel input wideband amplifier.

24. A summing circuit according to claim 14, wherein said adder comprises a summing amplifier.

25. A summing circuit according to claim 14, further characterized by an optical image spatially disposed directly downstream from the optical input of said linear image sensor.

26. A summing circuit according to claim 25, wherein said optical image comprises a wide angle photographic negative.

* * * * *